(12) United States Patent
Nakao

(10) Patent No.: US 8,911,209 B2
(45) Date of Patent: Dec. 16, 2014

(54) HELICOPTER, ROTOR THEREOF, AND CONTROL METHOD THEREOF

(75) Inventor: Masahiro Nakao, Aichi (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 618 days.

(21) Appl. No.: 12/811,295

(22) PCT Filed: Jan. 9, 2009

(86) PCT No.: PCT/JP2009/050232
§ 371 (c)(1),
(2), (4) Date: Aug. 17, 2010

(87) PCT Pub. No.: WO2009/093491
PCT Pub. Date: Jul. 30, 2009

(65) Prior Publication Data
US 2010/0308155 A1    Dec. 9, 2010

(30) Foreign Application Priority Data

Jan. 24, 2008 (JP) ................................. 2008-013568

(51) Int. Cl.
*B64C 27/635* (2006.01)
*B64C 27/51* (2006.01)
*B64C 27/54* (2006.01)

(52) U.S. Cl.
CPC ............. *B64C 27/51* (2013.01); *B64C 27/54* (2013.01)
USPC ..................................... 416/105; 244/17.25

(58) Field of Classification Search
CPC ................. B64C 27/51; B64C 27/54
USPC ......... 244/177, 17.11, 17.25, 17.13; 416/103, 416/104, 105, 108, 148
See application file for complete search history.

(56) References Cited

U.S. PATENT DOCUMENTS

| 3,232,348 A | * | 2/1966 | Jarosch ................... 416/105 |
| 3,232,349 A | * | 2/1966 | Ballauer ................... 416/117 |
| 3,782,854 A | | 1/1974 | Rybicki |
| 3,999,886 A | * | 12/1976 | Ormiston et al. ............ 416/104 |

FOREIGN PATENT DOCUMENTS

| JP | 57-30719 | 2/1982 |
| JP | 9-48398 | 2/1997 |
| JP | 2003-137191 | 5/2003 |
| JP | 2005-238944 | 9/2005 |
| JP | 2007-55406 | 3/2007 |

OTHER PUBLICATIONS

Machine translation of JP 2007055406 A.*

(Continued)

*Primary Examiner* — Brian M O'Hara
(74) *Attorney, Agent, or Firm* — Wenderoth, Lind & Ponack, L.L.P.

(57) ABSTRACT

A helicopter rotor include a blade, a rotor hub which supports the blade, and a lead-lag angle mechanism configured to change the lead-lag angle of the blade in synchronization with the rotation of the rotor hub. The lead-lag angle mechanism changes the lead-lag angle of the blade such that a circumferential speed of a blade tip of the blade (3) is slower on a forward side and faster on a backward side. The result is a helicopter, a helicopter rotor, and a control method of a helicopter that enable higher speed flight.

10 Claims, 16 Drawing Sheets

(56) References Cited

OTHER PUBLICATIONS

Japanese Office Action mailed Dec. 17, 2010 in corresponding Japanese Patent Application No. 2008-013568 w/partial translation.

International Search Report issued Apr. 14, 2009 in International (PCT) Application No. PCT/JP2009/050232.
Informal Comments on the Written Opinion of the International Searching Authority filed Jun. 4, 2009 in International (PCT) Application No. PCT/JP2009/050232 w/translation.

* cited by examiner

HELICOPTER, ROTOR THEREOF, AND CONTROL METHOD THEREOF

TECHNICAL FIELD

The present invention relates to a helicopter.

BACKGROUND ART

There is a demand to increase the flying speed of a helicopter. In a forward flight of a helicopter, by cyclic control for changing pitch angles of the blades of the rotor, a rotation plane of the rotor is forward-tilted to generate thrust in the forward direction. Referring to FIG. 1, as for a rotor of a conventional helicopter, an airspeed of a forward blade 101 is represented by the sum of a rotation speed (a circumferential speed) and a forward speed of the helicopter, and an airspeed of a backward blade 102 is represented by the difference between the rotation speed and the forward speed of the helicopter. When the forward speed of the helicopter is high, a shock wave is generated at the forward blade 101 of high airspeed, and a stall occurs at the backward blade 102 of low airspeed. When the stall occurs at the backward blade 102, a rotation plane of the rotor is backward-tilted and accordingly a thrust in a forward direction cannot be generated. For the above-mentioned reason, the limit of forward speed of a single rotor helicopter has been considered to be about 200 knots (370 km/hr).

Japanese patent publication (JP-A-Heisei 9-48398) discloses a lead-lag constraint device. The lead-lag constraint device includes a stopper for limiting displacement of a blade in a lead-lag direction. The stopper moves to a position of almost entirely limiting the displacement of the blade in the lead-lag direction in ground rotor run and moves to a position of allowing the displacement of the blade in air rotor run.

DISCLOSURE OF INVENTION

An object of the present invention is to provide a helicopter, a helicopter rotor, and a control method of a helicopter that enable high speed flight.

In a first aspect of the present invention, a helicopter rotor includes: a blade; a rotor hub which supports the blade; and a lead-lag angle mechanism configured to change a lead-lag angle of the blade in synchronization with rotation of the rotor hub.

In a second aspect of the present invention, a helicopter includes: a rotor; and a lead-lag angle control system. The rotor includes: a blade; a rotor hub which supports the blade; and a lead-lag angle mechanism configured to change a lead-lag angle of the blade in synchronization with a rotation of the rotor hub. The lead-lag angle control system changes the lead-lag angle of the blade in synchronization with the rotation of the rotor hub.

In a third aspect of the present invention, a control method of a helicopter is achieved by: supporting a blade by a rotor hub; and changing a lead-lag angle of the blade in synchronization with a rotation of the rotor hub of a helicopter.

According to the present invention, a helicopter, a helicopter rotor, and a control method of a helicopter that enable high speed flight are provided.

BEST MODE FOR CARRYING OUT THE INVENTION

Referring to attached drawings, a helicopter having a rotor according to the present invention will be described in detail below.

First Embodiment

Figure 1:
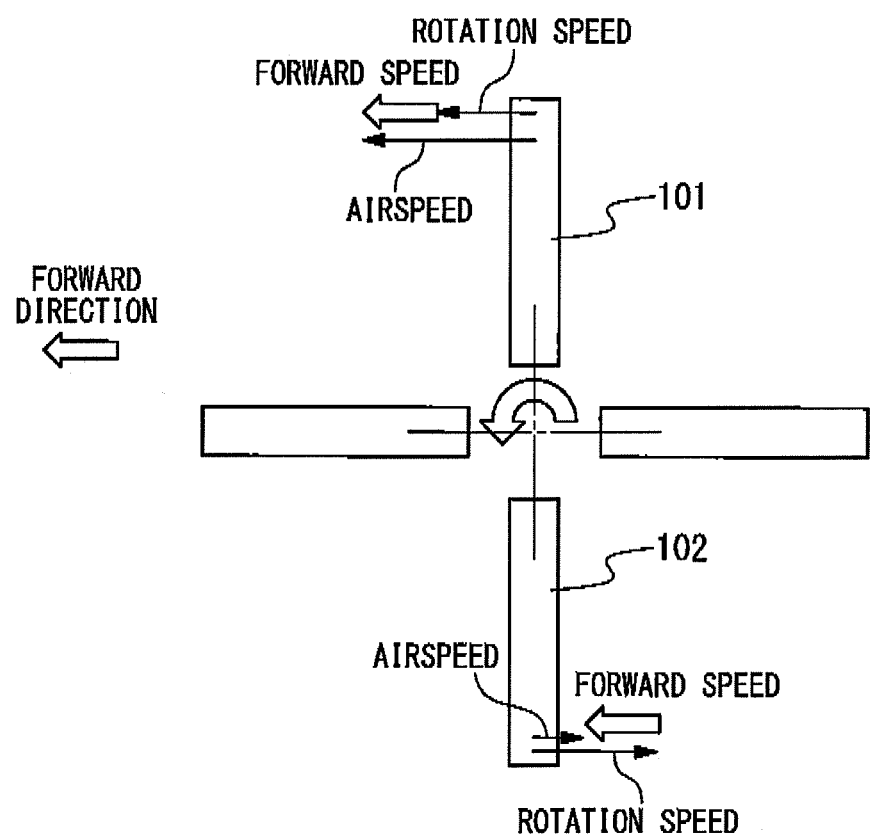
FIG. 1 is a top view of a conventional rotor.
Figure 2:
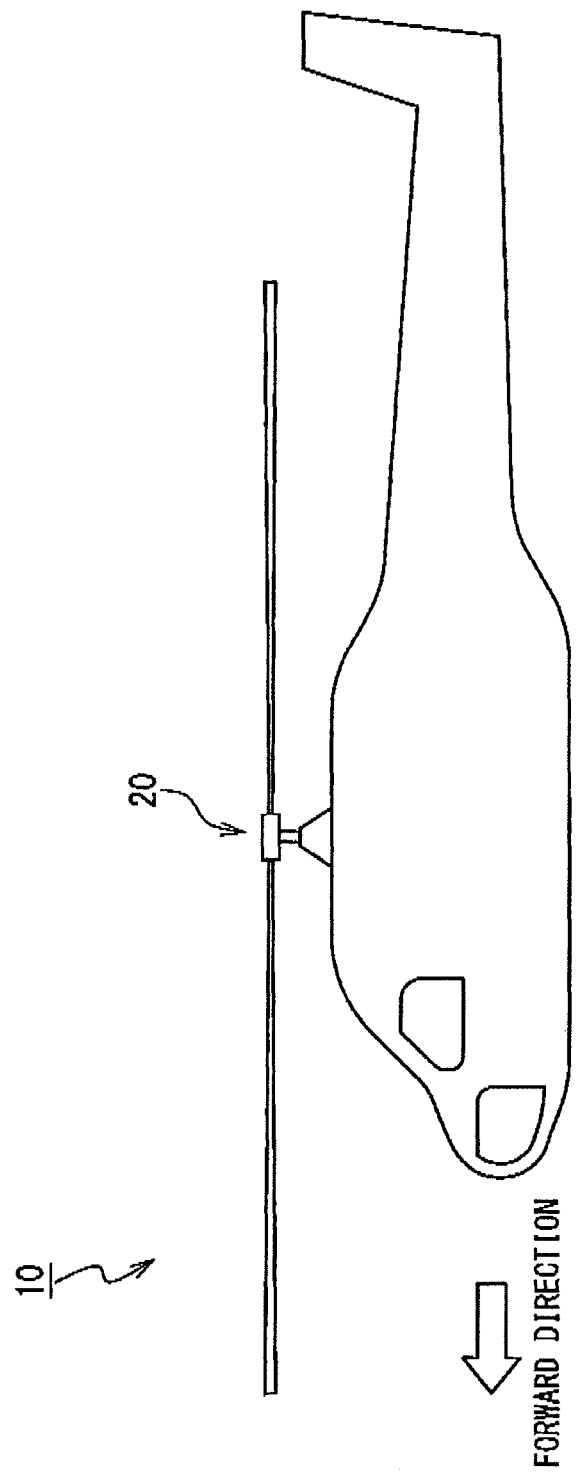
FIG. 2 is a side view of a helicopter according to a first embodiment of the present invention.

FIG. 2 shows a helicopter 10 according to a first embodiment of the present invention. The helicopter 10 includes a rotor 20 as a main rotor.

Figure 3:
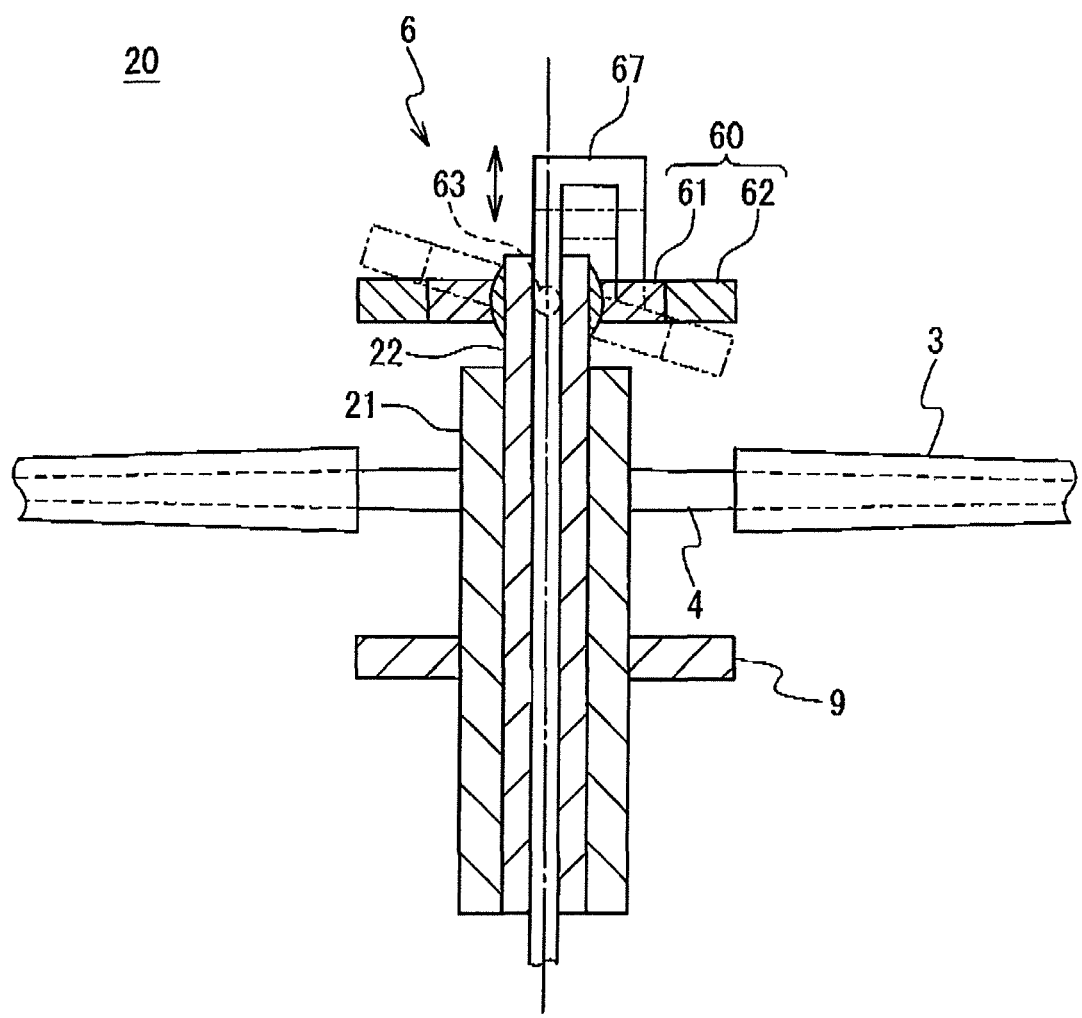
FIG. 3 is a cross-sectional view of a rotor according to the first embodiment.

Referring to FIG. 3, the rotor 20 includes a rotor hub 21 as a rotation system, spars 4 supported by the rotor hub 21, blades 3 supported by the rotor hub 21 via the spars 4, a feathering swash plate 9 for controlling pitch angles of the blades 3, and a lead-lag angle control mechanism 6 for controlling lead-lag angles of the blades 3. The spar 4 supports the centrifugal force acting on the blade 3. The lead-lag angle control mechanism 6 changes the lead-lag angles of the blades 3 in synchronization with the rotation of the rotor hub 21. A feathering swash plate 9 is connected to the blades 3 via rods which are not shown in the drawing. The lead-lag angle control mechanism 6 includes a hollow shaft 22 as a fixed system, a lead-lag swash plate 60 supported by the hollow shaft 22 such that the lead-lag swash plate 60 can rotate around a rotation axis 63, and a rod 67. The lead-lag swash plate 60 is formed in a circular disc shape, and has an inside fixed portion 61 and an outside rotation portion 62. The spars 4 are arranged between the lead-lag swash plate 60 and the feathering swash plate 9. The fixed portion 61 is supported by the hollow shaft 22 such that the fixed portion 61 can rotate around the rotation axis 63. The rotational portion 62 is supported by the fixed portion 61 such that the rotational portion 62 freely rotates. The rotor hub 21 is formed in a hollow shaft shape. The hollow shaft 22 is coaxially arranged inside the rotor hub 21. The rod 67 extends inside the hollow shaft 22 and is connected to the fixed portion 61. When the rotor hub 21 rotates around its rotation axis, the spars 4 and the blades 3 rotate together with the rotor hub 21. A displacement of the rod 67 in the direction of the rotation axis of the hub 21 causes the lead-lag swash plate 60 to rotate around the rotation axis 63, and as a result, a tilt of the lead-lag swash plate 60 with respect to the rotation axis of the rotor hub 21 changes. The rotation axis 63, for example, is parallel to a left-right direction of the helicopter 10.

Figure 4:
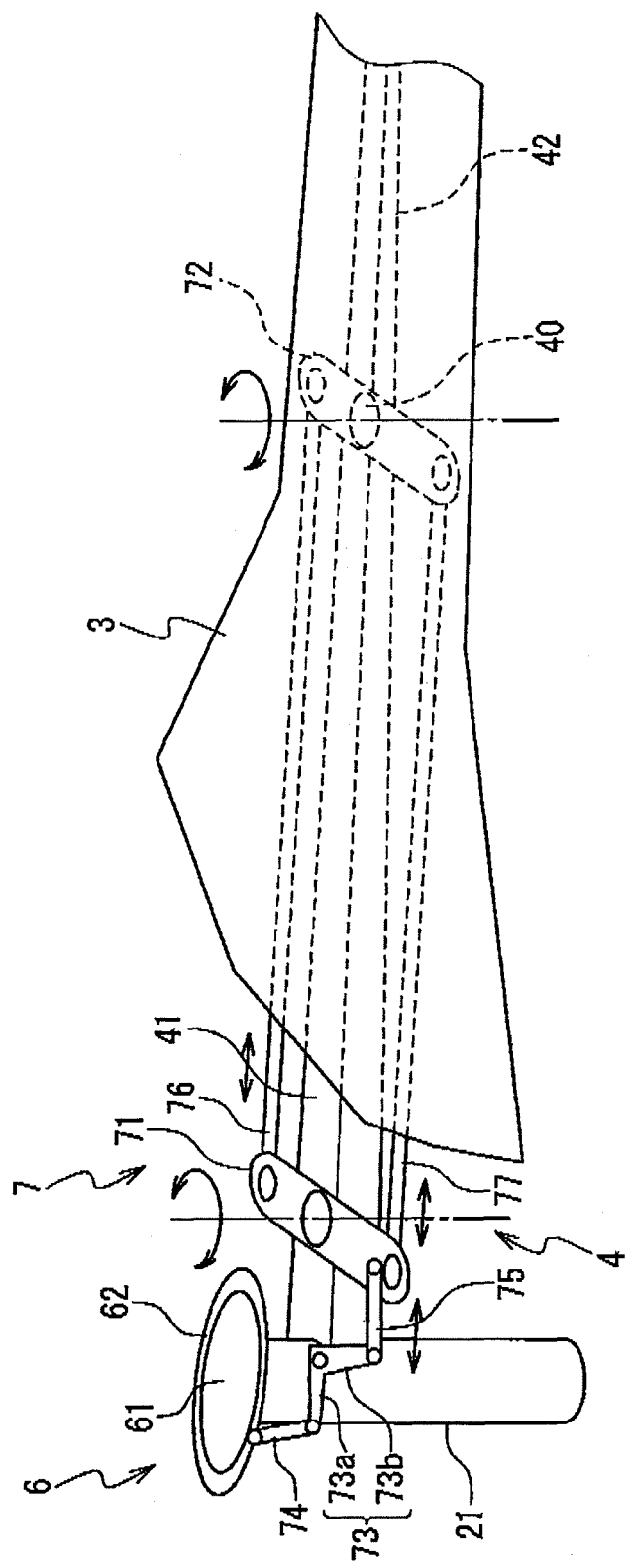
FIG. 4 is a perspective view of the rotor according to the first embodiment.

Referring to FIG. 4, the spar 4 is provided with a lead-lag hinge 40. The spar 4 includes: a hub side portion 41 positioned on the rotor hub 21 side (an inner side with respect to a rotation radius direction of the rotor 20) from the lead-lag hinge 40; and a blade tip side portion 42 positioned on the outer side (an outer side with respect to the rotation radius direction of the rotor 20) from the lead-lag hinge 40. The blade 3 is coupled with the blade tip side portion 42. The lead-lag angle control mechanism 6 includes a link mechanism 7 which connects the lead-lag swash plate 60 to the blade 3. The link mechanism 7 includes: a plate 71 supported by the hub side portion 41 such that the plate 71 can rotate; a plate 72 coupled with the blade tip side portion 42; a crank 73 supported by the rotor hub 21 such that the crank 73 can rotate; a rod 74 for connecting the rotation portion 62 to a first portion 73a of the crank 73; a rod 75 for connecting a second portion 73b of the crank 73 to the plate 71; and rods 76 and 77 for connecting the plate 71 to the plate 72. The hub side portion 41 is provided with mechanisms (not shown) of a typical articulated helicopter such as a feathering hinge and a flapping hinge.

When the lead-lag swash plate 60 tilts from a state perpendicular to the rotation axis of the rotor hub 21, the first portion 73a of the crank 73 moves along the rotation axis direction of the rotor hub 21 in synchronization with the rotation of the rotor hub 21. As a result, the blade tip side portion 42, the plate 72, and the blade 3 rotate around the lead-lag hinge 40 in synchronization with the rotation of the rotor hub 21. The rotation of the blade 3 around the lead-lag hinge 40 changes the lead-lag angle of the blade 3. Accordingly, the lead-lag angle of the blade 3 changes in synchronization with the rotation of the rotor hub 21.

Figure 5:
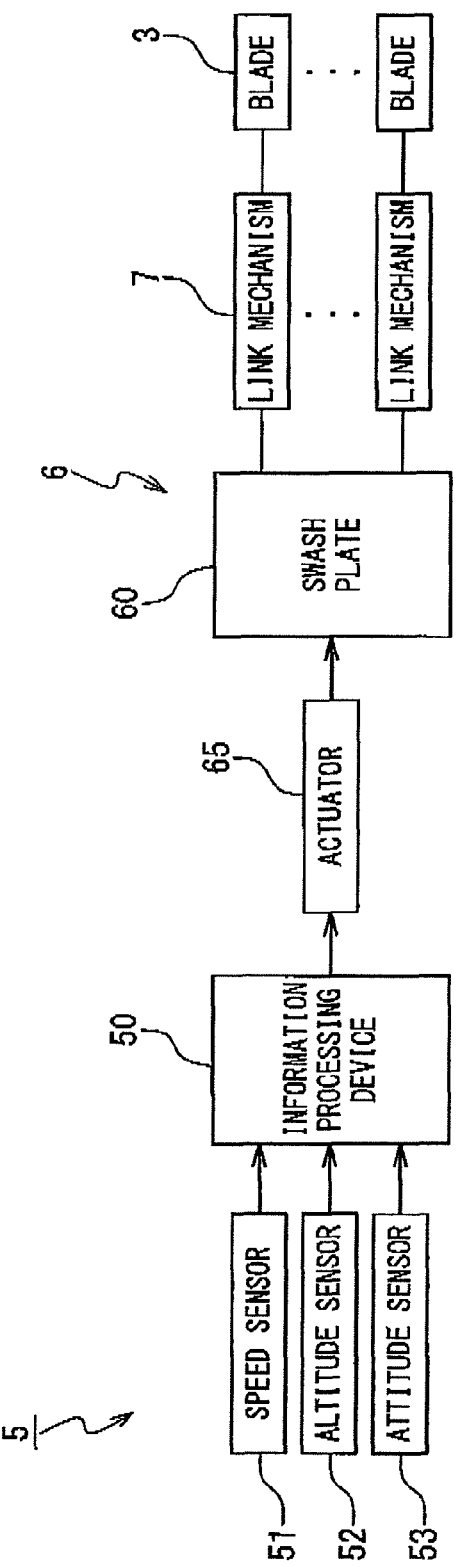
FIG. 5 is a block diagram of a control system of the helicopter according to the first embodiment.

As shown in FIG. 5, a lead-lag angle control system 5 of the helicopter 10 includes a speed sensor 51 for detecting speed V of the helicopter 10, an altitude sensor 52 for detecting an altitude of the helicopter 10, an attitude sensor 53 for detecting an attitude, such as a bank angle, of the helicopter 10, an information processing device 50, the lead-lag angle control mechanism 6, and the blades 3. The lead-lag angle control mechanism 6 includes an actuator 65 for driving the lead-lag swash plate 60 via the rod 67.

According to the present embodiment, the lead-lag angles of all the blades 3 of the rotor 20 can be changed by one actuator 65 in synchronization with the rotation of the rotor hub 21.

Figure 6:
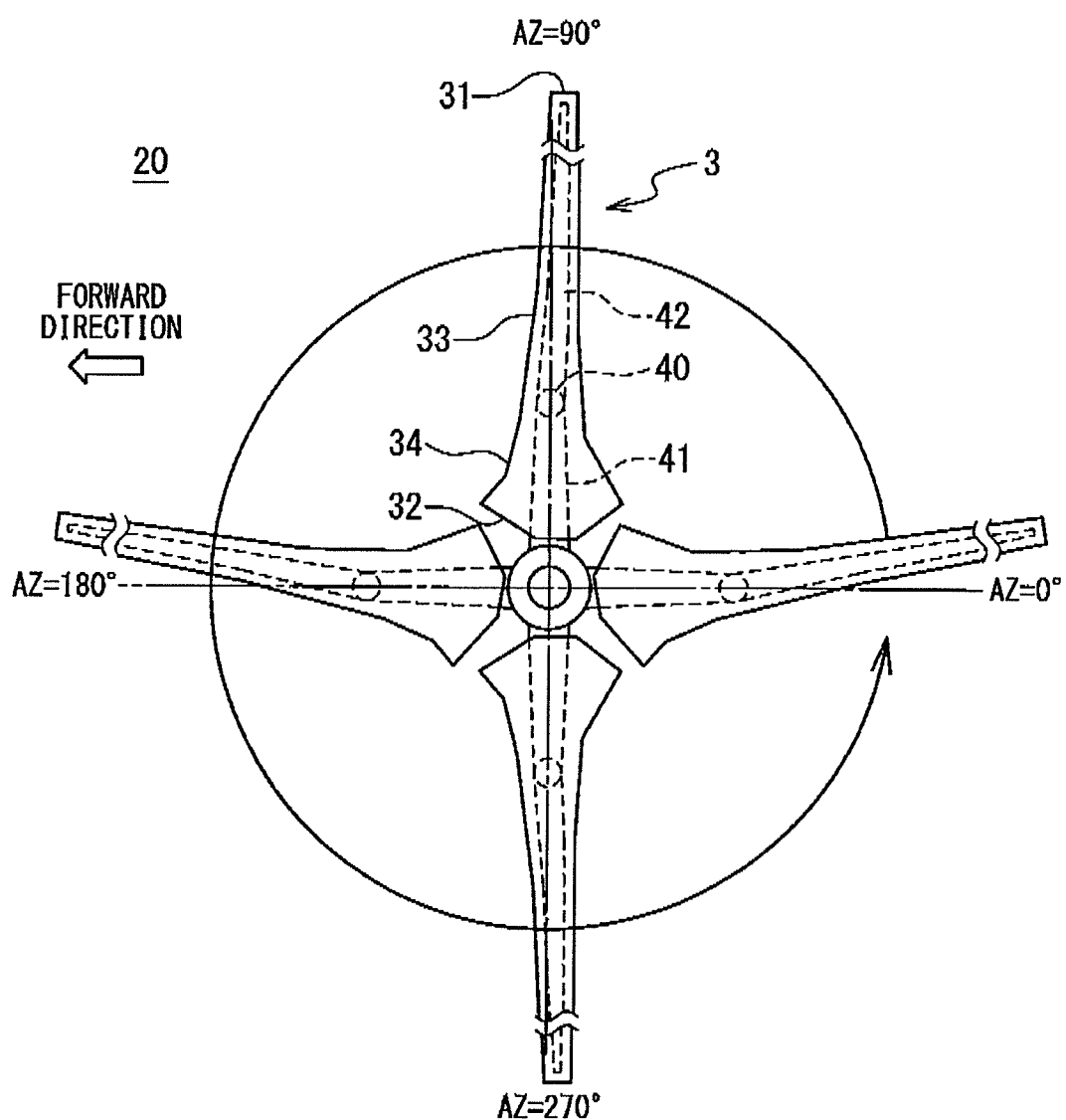
FIG. 6 is a top view of the rotor according to the first embodiment.

Referring to FIG. 6, the blade 3 includes: a hub side portion 34 positioned on the rotor hub 21 side (a side of a hub side end edge 32 of the blade 3) from the position of the lead-lag hinge 40; and a blade tip side portion 33 positioned on the outer side with respect to the rotation radius direction of the rotor 20 (a side of a blade tip 31) from the position of the lead-lag hinge 40. The blade tip side portion 33 is coupled to the blade tip side portion 42. The blade tip side portion 42 is arranged inside the blade tip side portion 33, and the hub side portion 41 is arranged at least partially inside the hub side portion 34. Since the hub side portion 41 is arranged inside the hub side portion 34, air resistance of the hub side portion 41 is reduced.

An azimuth angle AZ is defined around the rotation axis of the rotor 20 (the rotation axis of the rotor hub 21). The azimuth angle AZ corresponding to the rear of the helicopter 10 is 0 degrees. A direction in which the azimuth angle AZ increases coincides with the rotation direction of the rotor 20. When the rotor 20 rotates in a counterclockwise direction as viewed from above, a right direction of the helicopter 10 corresponds to the azimuth angle AZ of 90 degrees, the front (the forward direction) of the helicopter 10 corresponds to the azimuth angle AZ of 180 degrees, and a left direction of the helicopter 10 corresponds to the azimuth angle AZ of 270 degrees.

In a case where the lead-lag swash plate 60 tilts from a state perpendicular to the rotation axis of the rotor hub 21, the lead-lag angle control mechanism 6 changes the lead-lag angle of the blade 3 such that the circumferential speed of the blade tip 31 of the blade 3 is slow when the blade 3 moves from the backward side toward the forward side of the helicopter 10 and such that the circumferential speed of the blade tip 31 is fast when the blade 3 moves from the forward side toward the backward side of the helicopter 10.

The closer the lead-lag hinge 40 is to a center of mass of the blade 3, the more a load of the actuator 65 is reduced. When the lead-lag hinge 40 is located at the center of mass of the blade 3, the load of the actuator 65 is reduced most. In a case where the lead-lag hinge 40 is located at an inner side with respect to the rotation radius direction of the rotor 20 from the center of mass of the blade 3, behavior of the blade 3 is stabilized when a failure occurs in the lead-lag angle control mechanism 6.

The number of the blades 3 may be four as shown in FIG. 6 or may be other than four.

Figure 7:
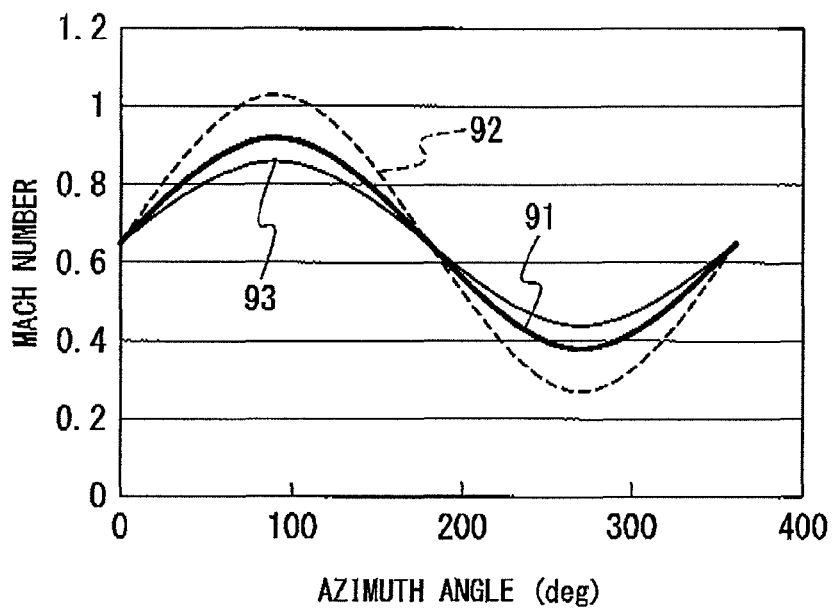
FIG. 7 is a graph showing relations between airspeed of a blade tip of the rotor according to the first embodiment and an azimuth angle.

Referring to a graph shown in FIG. 7, advantageous effects of the present embodiment will be explained. A horizontal axis of the graph represents an azimuth angle of the blade 3 (for example, an azimuth angle of a portion of the blade 3 at a position of the lead-lag hinge 40), and a vertical axis of the graph represents the airspeed of the blade tip 31 in Mach number. It is supposed that a radius R of the rotor 20 is 8 meters, that the lead-lag hinge 40 is located at a position of 40% of the radius R, and that the number of revolutions of the rotor 20 is 250 rpm. A curve 91 represents a relation between the airspeed of the blade tip 31 and the azimuth angle in the case that the forward speed of the helicopter 10 is 250 knots (463 km/h) and that amplitude of the lead-lag angle of the blade 3 is 15 degrees. A curve 92 represents a relation between the airspeed of the blade tip 31 and the azimuth angle in the case that the forward speed of the helicopter 10 is 250 knots and that the lead-lag angle of the blade 3 is fixed. A curve 93 represents a relation between the airspeed of the blade tip 31 and the azimuth angle in the case that the forward speed of the helicopter 10 is 150 knots (278 km/h) and that the lead-lag angle of the blade 3 is fixed.

By changing the lead-lag angle of the blade 3 in synchronization with the rotation of the rotor hub 21, the airspeed of the blade tip 31 is lower when the blade 30 is located on the forward side (at a position of the azimuth angle of 90 degrees) and the airspeed of the blade tip 31 is higher when the blade 30 is located on the backward side (at a position of the azimuth angle of 270 degrees) as compared with a fixed lead-lag angle (curve 92, e.g.). Accordingly, the helicopter 10 can fly at a high speed.

Figure 8:
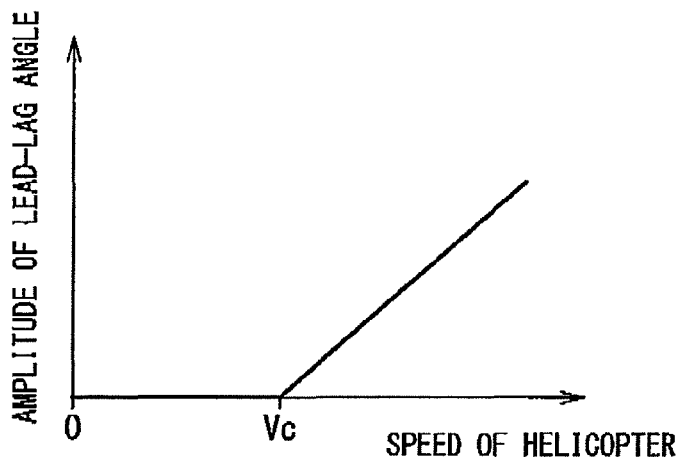
FIG. 8 is a graph illustrating a control rule according to the first embodiment.

Referring to FIG. 8, a control method of the lead-lag angle will be explained in detail. The information processing device 50 compares the speed V of the helicopter 10 with a threshold Vc. When the speed V is equal to the threshold Vc or less, the actuator 65 locates the lead-lag swash plate 60 such that the amplitude of the change of the lead-lag angle of the blade 3 is zero. When the speed V is more than the threshold Vc, the actuator 65 locates the lead-lag swash plate 60 such that the amplitude of the change of the lead-lag angle is not zero and that the amplitude of the change of the lead-lag angle is larger as the speed V is higher.

More specifically, when the speed V is equal to the threshold Vc or less, the actuator 65 retains the lead-lag swash plate 60 in a state perpendicular to the rotation axis of the rotor hub 21. When the speed V is more than the threshold Vc, the actuator 65 tilts the lead-lag swash plate 60 from the state perpendicular to the rotation axis of the rotor hub 21. The higher the speed V is, the more the actuator 65 tilts the lead-lag swash plate 60 from the state perpendicular to the rotation axis of the rotor hub 21. Accordingly, when the speed V is equal to the threshold Vc or less, the lead-lag angle does not change in synchronization with the rotation of the rotor hub 21. When the speed V is higher than the threshold Vc, the lead-lag angle changes in synchronization with the rotation of the rotor hub 21, and the amplitude of the change in the lead-lag angle is larger as the speed V is higher. The larger the amplitude of the change of the lead-lag angle is, the slower the circumferential speed of the blade tip 31 of the blade 3 is when the blade 3 moves from the backward side toward the forward side of the helicopter 10 and the faster the circumferential speed of the blade tip 31 is when the blade 3 moves from the forward side toward the backward side of the helicopter 10.

The information processing device 50 controls the threshold Vc such that the threshold Vc is smaller as the altitude of the helicopter 10 is higher. The information processing device 50 controls the threshold Vc such that the threshold Vc is smaller as the bank angle of the helicopter 10 is larger.

According to such control, the circumferential speed of the blade 3 is adjusted by a necessary amount at a necessary timing.

Second Embodiment

A helicopter 10 according to a second embodiment of the present invention is configured by partially modifying the helicopter 10 according to the first embodiment. Hereinafter, the helicopter 10 according to the present embodiment will be explained with regard to modified portions.

Figure 9:
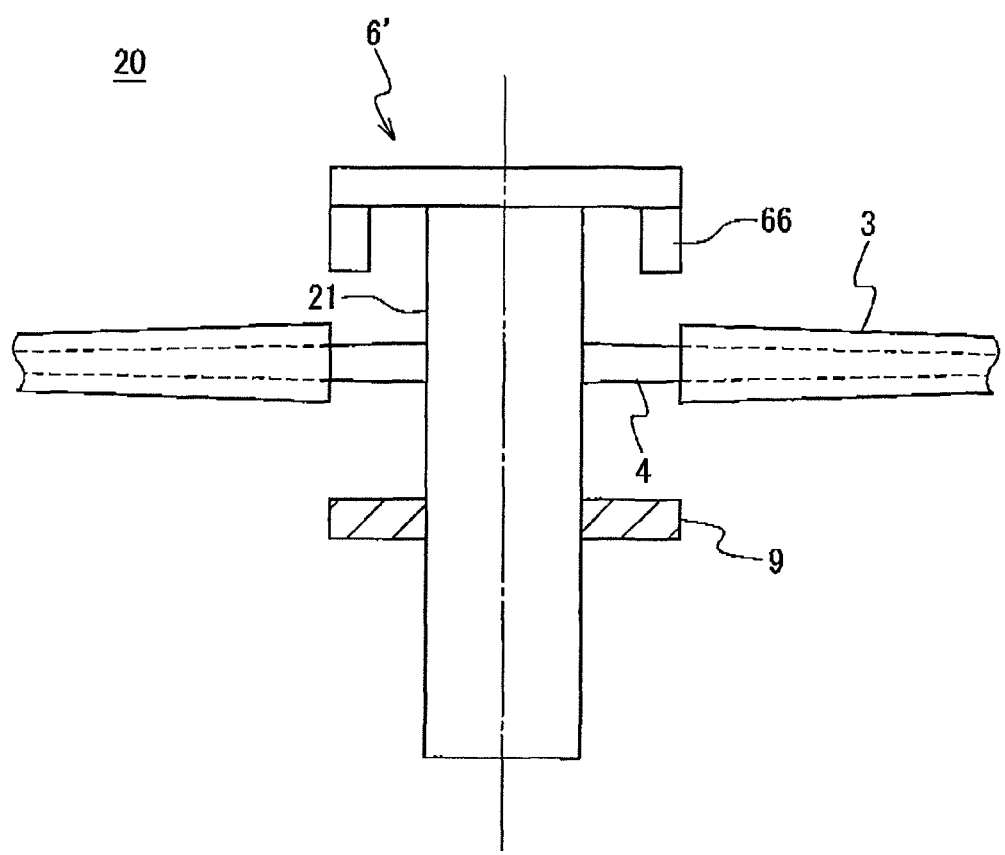
FIG. 9 is a side view of a rotor according to a second embodiment of the present invention.

Referring to FIG. 9, the rotor 20 according to the present invention includes a lead-lag angle control mechanism 6' for controlling the lead-lag angles of the blades 3 in place of the lead-lag angle control mechanism 6. The lead-lag angle control mechanism 6' includes actuators 66 supported by the rotor hub 21. The actuators 66 are electric actuators. Electric power and control signals are supplied to the actuator 66 via slip rings (not shown) provided to the rotor hub 21. The actuators 66 are provided to the blades 3, respectively.

Figure 10:
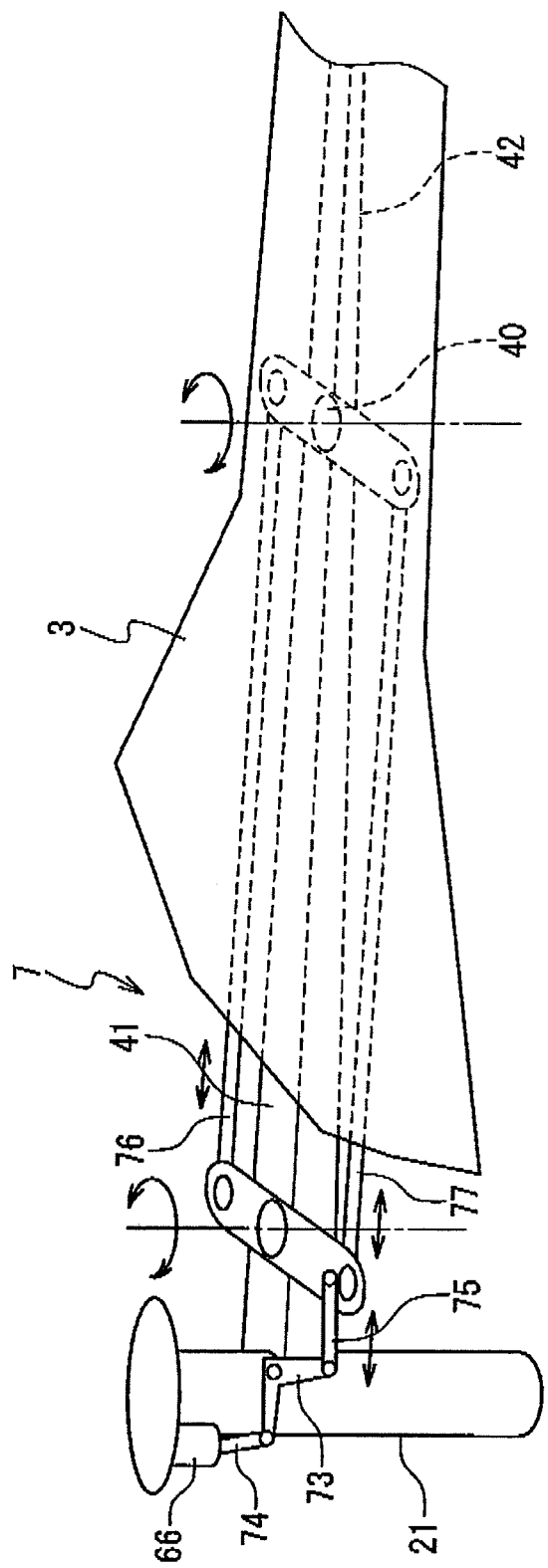
FIG. 10 is a perspective view of the rotor according to the second embodiment.

Referring to FIG. 10, the lead-lag angle control mechanism 6' includes the above-mentioned link mechanism 7. In the present embodiment, the link mechanism 7 connects the actuator 66 to the blade 3. The actuator 66 drives the rod 74 along the direction of the rotation axis of the rotor hub 21 in synchronization with the rotation of the rotor hub 21. As a result, the lead-lag angle of the blade 3 changes in synchronization with the rotation of the rotor hub 21.

Figure 11:
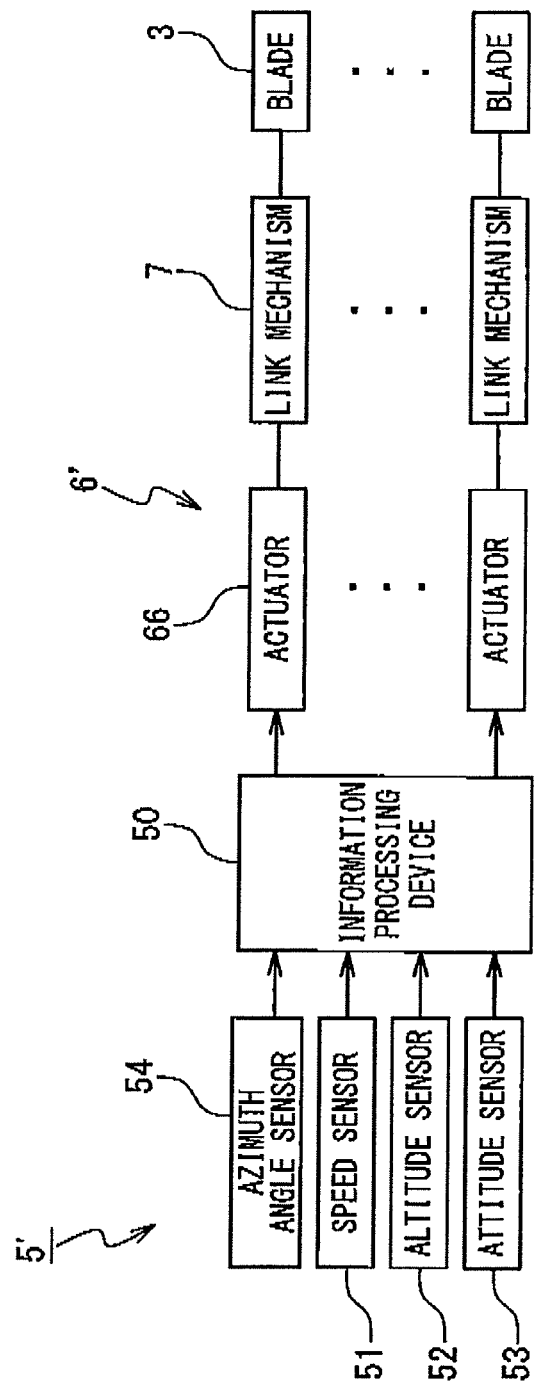
FIG. 11 is a block diagram of a control system of a helicopter according to the second embodiment.

The helicopter 10 according to the present embodiment includes a lead-lag angle control system 5' in place of the lead-lag angle control system 5. As shown in FIG. 11, the lead-lag angle control system 5' includes the speed sensor 51, the altitude sensor 52, the attitude sensor 53, an azimuth angle sensor 54 for detecting the azimuth angle (a rotation angle position) of the rotor hub 21, the information processing device 50, the lead-lag angle control mechanism 6', and the blades 3.

The actuator 66 drives the blade 3 via the link mechanism 7 based on the azimuth angle of the rotor hub 21 (an azimuth angle of a representative position of the rotor hub 21) detected by the azimuth angle sensor 54 such that the lead-lag angle changes in synchronization with the rotation of the rotor hub 21.

The lead-lag angle control system 5' can execute the controls of the lead-lag angle described in the first embodiment. Moreover, since the actuators 66 are respectively provided to the blades 3 in the present embodiment, the lead-lag angle control system 5' can execute a more sophisticated control of lead-lag angle.

Figure 12:
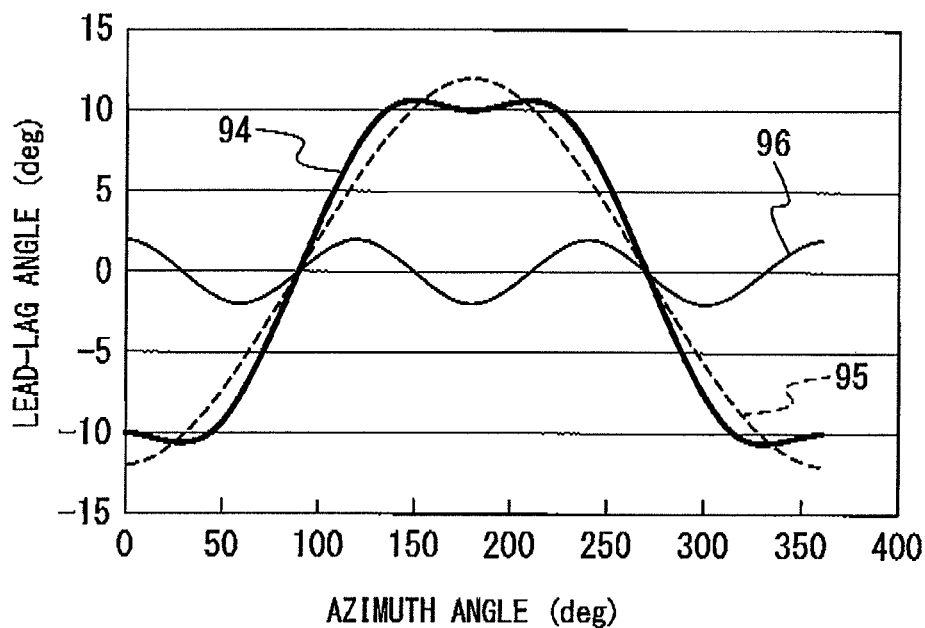
FIG. 12 is a graph showing a relation between lead-lag angle and azimuth angle of a blade of the rotor according to the second embodiment.
Figure 13:
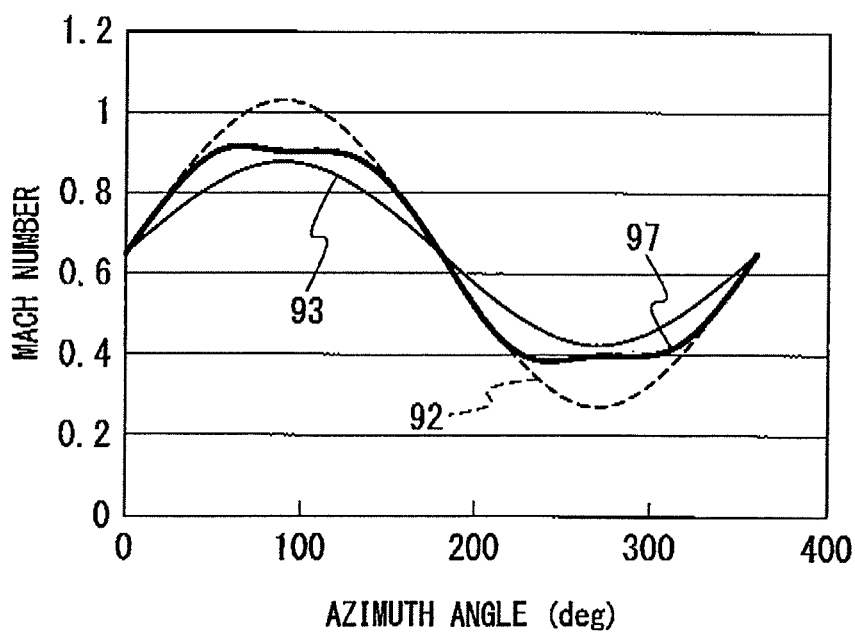
FIG. 13 is a graph showing a relation between airspeed of a blade tip of the rotor according to the second embodiment and azimuth angle.

Referring to FIGS. 12 and 13, the more sophisticated control of lead-lag angle will be explained.

In a graph shown in FIG. 12, a horizontal axis represents the azimuth angle of the blade 3, and a vertical axis represents the lead-lag angle of the blade 3. The actuator 66 drives the blade 3 such that the lead-lag angle of the blade 3 changes in accordance with a curve 94. Here, the change of the lead-lag angle represented by the curve 94 is a sum of a first frequency component represented by a curve 95 and a second frequency component represented by a curve 96. The frequency of the first frequency component coincides with the rotation frequency of the rotor hub 21. The frequency of the second frequency component is three times of the rotation frequency of the rotor hub 21. A phase difference between the first frequency component and the second frequency component is, for example, 30 degrees. The amplitude of the lead-lag angle in the curve 94 is 10 degrees.

In a graph shown in FIG. 13, a horizontal axis represents the azimuth angle of the blade 3 and a vertical axis represents the airspeed of the blade tip 31 in Mach number. It is supposed that a radius R of the rotor 20 is 8 meters, that the lead-lag hinge 40 is located at a position of 40% of the radius R, and that the number of revolutions of the rotor 20 is 250 rpm. A curve 97 represents a relation between the airspeed of the blade tip 31 and the azimuth angle in the case that the forward speed of the helicopter 10 is 250 knots and that the lead-lag angle of the blade 3 changes in accordance with the curve 94. The curve 97 is compared with the above-mentioned curves 92 and 93. According to the present embodiment, the equivalent effect as that of the first embodiment can be achieved while reducing the amplitude of the lead-lag angle in comparison with the case of the first embodiment.

Figure 14:
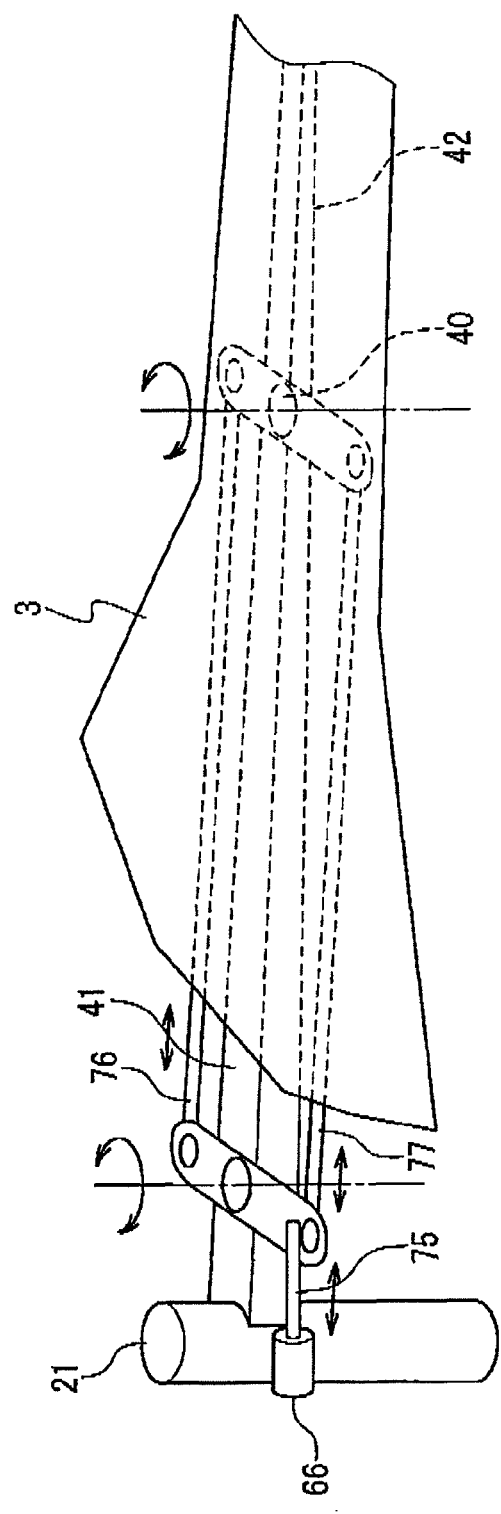
FIG. 14 is a perspective view of a rotor according to a modification example of the second embodiment.

Referring to FIG. 14, a modified example of the second embodiment will be explained. In the modified example, the actuator 66 changes the lead-lag angle of the blade 3 by driving the rod 75 along the rotation radius direction of the rotor 20.

Figure 15:
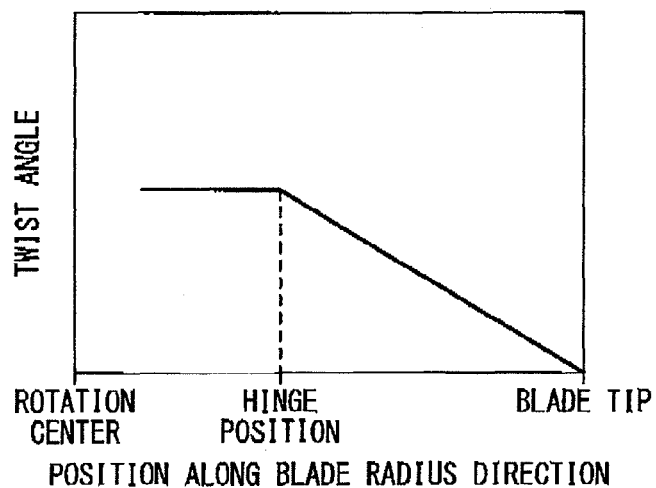
FIG. 15 is a graph showing twist angle distribution of the blade.
Figure 16:
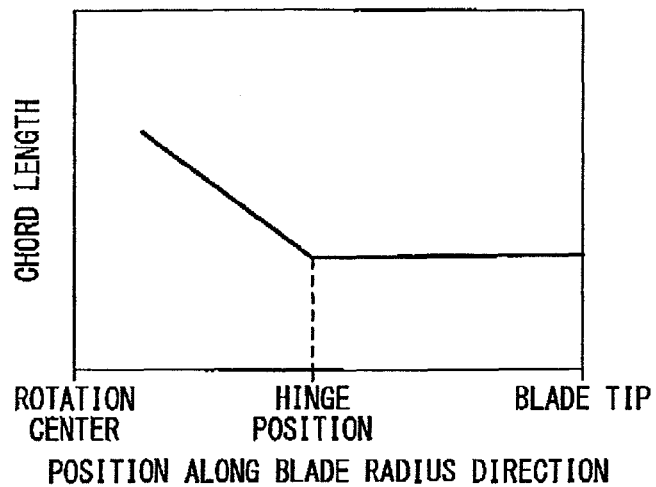
FIG. 16 is a graph showing chord length distribution of the blade.

Referring to FIG. 15 and FIG. 16, an example of the shape of the blade 3 according to the first and the second embodiments will be explained.

FIG. 15 is a graph showing a twist angle distribution of the blade 3. A horizontal axis of the graph represents position in the blade 3 along the rotation radius direction of the rotor 20, and a vertical axis of the graph represents the twist angle of the blade 3. The twist angle is constant from the hub side end edge 32 to the position of the lead-lag hinge 40, and decreases from the position of the lead-lag hinge 40 to the blade tip 31. Since the twist angle in the hub side portion 34 is constant, interference between the hub side portion 41 and the hub side portion 34 can be prevented when the lead-lag angle changes.

FIG. 16 is a graph showing distribution of chord length of the blade 3. A horizontal axis of the graph represents position in the blade 3 along the rotation radius direction of the rotor 20, and a vertical axis of the graph represents the chord length of the blade 3. The chord length decreases from the hub side end edge 32 to the position of the lead-lag hinge 40, and is constant from the position of the lead-lag hinge 40 to the blade tip 31. Since the chord length in the hub side portion 34 decreases from the hub side end edge 32 to the position of the lead-lag hinge 40, a lift distribution along the rotation radius direction in the hub side portion 34 is optimized.

The above-mentioned shape of the blade 3 is efficient in both hovering and forward flight.

Figure 17:
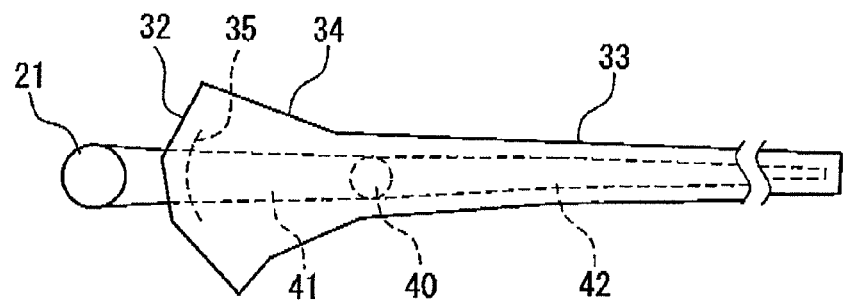
FIG. 17 is a top view of a rotor having rails and rollers.
Figure 18:
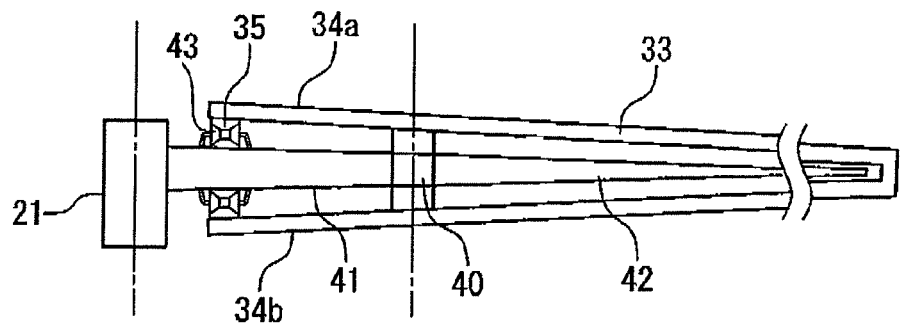
FIG. 18 is a side view of the rotor having rails and rollers.

Referring to FIGS. 17 and 18, a modified example of the rotor 20 according to the first and the second embodiments will be explained.

Referring to FIG. 17, the hub side portion 34 includes rails 35 in the vicinity of the hub side end edge 32. The rail 35 is formed in a circular arc shape of which center is the lead-lag hinge 40.

Referring to FIG. 18, the hub side portion 34 includes: an upper side skin 34a; the rail 35 provided on the inside of the upper side skin 34a; a lower side skin 34b; and the rail 35 provided on the inside of the lower side skin 34b. The hub side portion 41 includes: a roller 43 engaging the rail 35 provided to the upper side skin 34a; and a roller 43 engaging the rail 35 provided to the lower side skin 34b.

Figure 19:
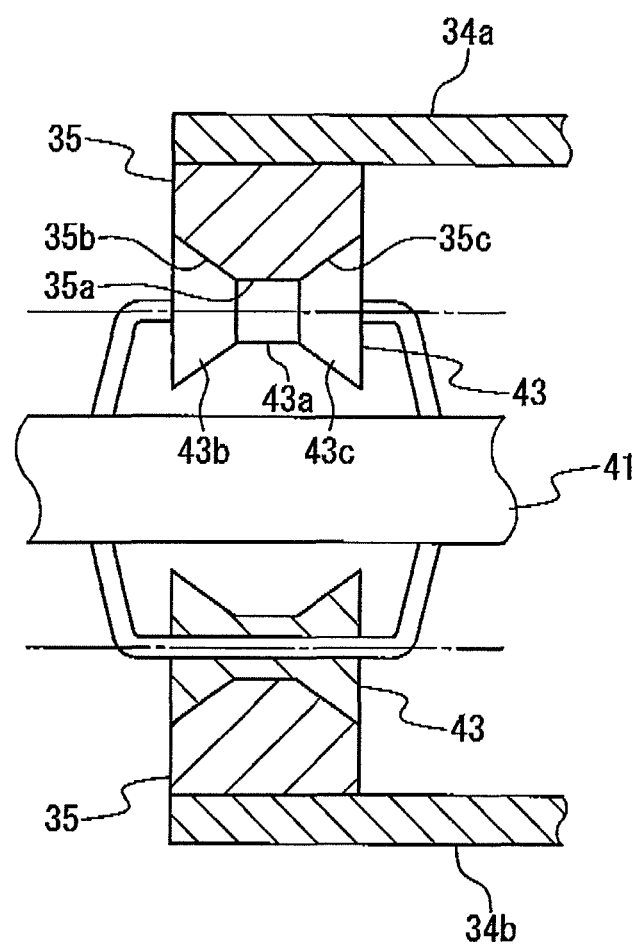
FIG. 19 shows an engagement state between the rail and the roller.

Referring to FIG. 19, the rail 35 has an axial section of trapezoid and has a top surface 35a, an inclined surface 35b, and an inclined surface 35c. The top surface 35a is arranged between the inclined surfaces 35b and 35c, and the inclined surfaces 35b and 35c are inclined in opposite directions to each other with respect to the top surface 35a. The inclined surface 35b is inclined toward the opposite side of the lead-lag hinge 40, and the inclined surface 35c is inclined toward the lead-lag hinge 40. The roller 43 includes an engaging surface 43a that faces and engages the top surface 35a; an engaging surface 43b that faces and engages the inclined surface 35b; and an engaging surface 43c that faces and engages the inclined surface 35c.

The rail 35 and the roller 43 enable smooth change in the lead-lag angle of the blade 3. Moreover, since the hub side portion 41 supports the hub side portion 34 via the rail 35 and the roller 43, aerodynamic load acting on the hub side portion 34 is transmitted to the hub side portion 41.

Figure 20:
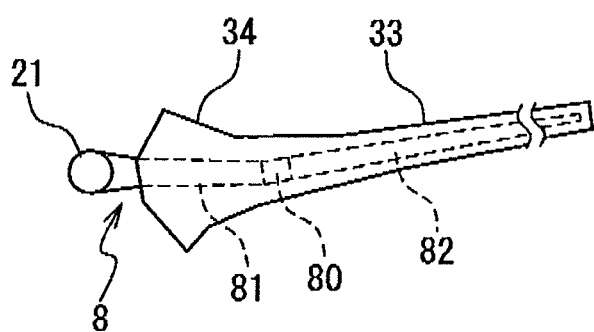
FIG. 20 is a top view of a rotor in which a flex beam is used as a spar.

As shown in FIG. 20, the above-mentioned spar 4 can be replaced by a spar 8. The spar 8 is formed as a flex beam. The spar 8 includes: a bending portion 80 corresponding to the lead-lag hinge 40; a hub side portion 81 corresponding to the hub side portion 41; and a blade tip side portion 82 corresponding to the blade tip side portion 42. The blade tip side portion 82 is coupled to the blade tip side portion 33 of the blade 3. Bending of the spar 8 at the bent portion 80 changes the lead-lag angle of the blade 3. Since the spar 8 greatly bends at the bent portion 80 in the direction of change in the lead-lag angle of the blade 3 and scarcely bends at the hub side portion 81 and the blade tip side portion 82 in the direction of change in the lead-lag angle of the blade 3, the position of the center of mass of the blade 3 is prevented from greatly changing when the lead-lag angle of the blade 3 changes.

The lead-lag angle control mechanisms 6 and 6' drive the blade 3 such that the lead-lag angle of the blade 3 changes correspondingly to the azimuth angle of the blade 3. The lead-lag angle control mechanisms 6 and 6' change the lead-lag angle of the blade 3 such that the circumferential speed of the blade tip 31 of the blade 3 is slower on the forward side and faster on the backward side. Accordingly, the helicopter 10 is capable of high speed flight.

This application is based upon and claims the benefit of priority from Japanese Patent Application No. 2008-013568, filed on Jan. 24, 2008, the disclosure of which is incorporated herein in its entirety by reference.

The invention claimed is:

1. A helicopter rotor comprising:
a blade;
a rotor hub which supports said blade; and
a lead-lag angle mechanism configured to change a lead-lag angle of said blade in synchronization with rotation of said rotor hub such that a lag angle is given to said blade on a first side of a helicopter movement direction, on which first side said blade is rotating in the movement direction, and a lead angle is given to said blade on a second side of the movement direction of said helicopter, on which second side said blade is rotating opposite to the movement direction, wherein:
said blade comprises a spar having a spar tip-side portion and a spar hub-side portion hinged to each other by a lead-lag hinge;
said lead-lag angle mechanism comprises a link mechanism that causes said spar tip-side portion to pivot about said lead-lag hinge with respect to said spar hub-side portion to give said blade the lag angle on the first side of the helicopter movement direction and the lead angle on the second side of the helicopter movement direction in synchronization with rotation of said rotor hub and in dependence upon a rotational position of said blade with respect to the helicopter movement direction;
said blade includes a blade hub side portion positioned on a rotor hub side with respect to said lead-lag hinge;
said spar hub side portion is arranged inside said blade hub side portion;
said blade hub side portion includes a first rail; and
said spar hub side portion includes a first roller which engage said first rail.

2. The helicopter rotor of claim 1, wherein said blade has said lead-lag hinge located at the center of mass of said blade such that said lead-lag angle mechanism changes the lead-lag angle by rotation of said blade around said lead-lag hinge.

3. The helicopter rotor of claim 1, wherein:
said rotor hub has said spar supported thereby; and
said blade has said lead-lag hinge located on said spar at a position at the center of mass of said blade such that said lead-lag angle mechanism changes the lead-lag angle by rotation of said blade around said lead-lag hinge.

4. The helicopter rotor of claim 3, wherein:
said blade has a twist angle that is constant from an edge of said blade at one end of said blade at the rotor hub side to said position of said lead-lag hinge and that decreases from said position of said lead-lag hinge to a blade tip of said blade; and
a chord length of said blade decreases from said end edge to said position of said lead-lag hinge.

5. The helicopter rotor of claim 1, wherein:
said blade hub side portion includes:
an upper side skin provided with said first rail,
a lower side skin, and
a second rail provided to said lower side skin; and said spar hub side portion includes a second roller which engages said second rail.

6. The helicopter rotor of claim 1, wherein said lead-lag angle mechanism includes a swash plate, said link mechanism connecting said swash plate to said blade.

7. A helicopter rotor comprising:
a blade;
a rotor hub which supports said blade, wherein an azimuth angle of rotation of said rotor hub is defined such that an azimuth angle of 180 degrees represents a forward direction, whereby a 0 degree azimuth angle is opposite in direction to the forward direction, an azimuth angle of 90 degrees is on a first side with respect to the forward direction and an azimuth angle of 270 degrees is on a second side with respect to the forward direction; and
a lead-lag angle mechanism configured to change a lead-lag angle of said blade in synchronization with rotation of said rotor hub such that a lag angle is given to said blade during movement of said blade on the first side, in which movement said blade is rotated by said rotor hub from the azimuth angle of 0 degrees, through 90 degrees and toward 180 degrees, and a lead angle is given to said blade during movement of said blade on the second side, in which movement said blade is rotated by said rotor hub from the azimuth angle of 180 degrees, through 270 degrees and toward 0 degrees, wherein:
said blade comprises a spar having a spar tip-side portion and a spar hub-side portion hinged to each other by a lead-lag hinge;
said lead-lag angle mechanism comprises a link mechanism that causes said spar tip-side portion to pivot about said lead-lag hinge with respect to said spar hub-side portion to give said blade the lag angle on the first side and the lead angle on the second side in synchronization with rotation of said rotor hub and in dependence upon a rotational position of said blade with respect to the azimuth angle;
said blade includes a blade hub side portion positioned on a rotor hub side with respect to said lead-lag hinge;
said spar hub side portion is arranged inside said blade hub side portion;
said blade hub side portion includes a first rail; and
said spar hub side portion includes a first roller which engages said first rail.

8. The helicopter rotor of claim 7, wherein said blade has said lead-lag hinge located at the center of mass of said blade such that said lead-lag angle mechanism changes the lead-lag angle by rotation of said blade around said lead-lag hinge.

9. The helicopter rotor of claim 7, wherein:
said rotor hub has said spar supported thereby;
said blade has said lead-lag hinge located on said spar at a position at the center of mass of said blade such that said lead-lag angle mechanism changes the lead-lag angle by rotation of said blade around said lead-lag hinge.

10. The helicopter rotor of claim 7, wherein said lead-lag angle mechanism includes a swash plate, said link mechanism connecting said swash plate to said blade.

* * * * *